United States Patent [19]
Cargile

[11] Patent Number: 5,921,072
[45] Date of Patent: Jul. 13, 1999

[54] MULCHING LAWN MOWER WITH VERTICAL CUTTING AND IMPROVED DISCHARGE ACTION AND CLIPPING DEPOSIT

[76] Inventor: W. Allen Cargile, 5796 Peach Hollow Rd., Franklin, Tenn. 37064

[21] Appl. No.: 08/671,365

[22] Filed: Jun. 27, 1996

[51] Int. Cl.[6] .................................................. A01D 34/60
[52] U.S. Cl. .......................................... 56/17.5; 56/320.2
[58] Field of Search .................... 56/16.7, 17.3, 56/17.5, 175, 320.1, 320.2, 255, 295

[56] References Cited

U.S. PATENT DOCUMENTS

| | | | |
|---|---|---|---|
| 2,942,400 | 6/1960 | Sylvester | 56/255 |
| 2,957,295 | 10/1960 | Brown | 56/295 |
| 3,413,783 | 12/1968 | Gordon | 56/320.2 |
| 5,117,616 | 6/1992 | McLane | 56/17.5 |
| 5,209,050 | 5/1993 | Carrigan | 56/320.1 X |
| 5,291,725 | 3/1994 | Meinerding | 56/295 |

Primary Examiner—Thomas B. Will
Assistant Examiner—Robert Pezzuto
Attorney, Agent, or Firm—Waddey & Patterson; Edward D. Lanquist, Jr.

[57] ABSTRACT

An improved mulching lawn mower has separate cutting and discharge chambers integral to the mower housing. An air flow initiated by cutting blade fan action positions uncut blades of grass ahead of the blade into a horizontal position where vertical cutting surfaces on the blade successively cut the blade into small clippings. The mower's air flow is directed vertically downward into the lawn at a front edge of the discharge chamber through a prepared opening, depositing the clippings into the lawn near the soil. Only one-half of the cut width of grass is cut in the cutting chamber and any suspended clippings from the cutting chamber are purged on each cycle. These measures limit the clipping density in the cutting chamber to an acceptable level.

18 Claims, 5 Drawing Sheets

MULCHING LAWN MOWER WITH VERTICAL CUTTING AND IMPROVED DISCHARGE ACTION AND CLIPPING DEPOSIT

BACKGROUND OF THE INVENTION

This invention relates to powered rotary lawn mowers. More particularly, the invention pertains to rotary lawn mowers which can perform a mulching or recycling function whereby each blade of grass is cut multiple times during one pass of the mower. The objective is to cut the grass clippings small enough to be deposited deep into the lawn in as direct manner as possible where they can decompose without interfering with healthy lawn growth.

Mulching lawn mowers, also called "recyclers", are well known in the art. Existing mulching mowers are designed to cut and re-cut the grass blades of the lawn within a completely enclosed cutting chamber which surrounds the mower blade. This multiple recutting of clippings is repeated in a haphazard manner until the clippings simply fall or are partially assisted back onto the lawn beneath the chamber. During times of robust lawn growth and wet conditions, this method of cutting grass blades and recutting of clippings will produce a compound build-up of clippings inside the cutting chamber to the point where the mower will clog and/or discharge unsightly clumps or stripes of clippings onto the finished lawn. The build-up of a dense clipping circulation leads to the formation of deposits around the inside walls of the cutting chamber which will alter the shape of the chamber, thereby impairing its function. One consequence of this clipping density build-up and effective chamber distortion is that the mower engine must work harder to cut and discharge the clippings to the point that the engine may stall.

Prior art mulching mowers are also deficient in their ability to bury the clippings deep into the lawn where they can decompose and supply nutrients. Clippings which are deposited at or near the surface of the finished lawn are unsightly and impede transmission of the sunlight needed for healthy growth. A primary obstacle to clipping penetration in the mulching process is that grass blades act as a filter over the soil. The clippings must pass through the layers of upright blades of grass to reach the preferred resting destination at or near the soil. To overcome this obstacle, the clippings have to be small enough to pass this filter. They also need to be directed downwardly at or near a right angle to the filter layer and with sufficient velocity, especially in wet conditions, to free themselves from the uncut grass blades. Prior art mulching mowers have achieved poor results in this area.

What is needed, then, is a mulching lawn mower which consistently produces small grass clippings without fouling or clogging the cutting chamber of the mower and which discharges the clippings into the lawn in a manner which causes them to be deposited at or near the soil

SUMMARY OF THE INVENTION

The mulching mower of this invention overcomes the deficiencies of the prior art by use of a design which: (1) reduces the density of grass clippings inside the cutting chamber; (2) produces a positive vertical discharge of the clippings into the lawn; and (3) provides a clipping deposit absorption rate which exceeds the clipping production rate. The design elements which implement these performance improvements are as follows:

1. Cutting Blade. The blade cutting area is defined by the horizontal circle formed by the outermost and lowest point of the cutting edge of the mower's blade as it rotates about its vertical axis. The diameter of this circle is the cut width of the mower. The initial cut is done along the front semi-circle of this area as the mower moves forward. The improved mower blade of this invention has two fans. An outer fan causes a low pressure condition to exist along the outer periphery of the blade cutting area which draws grass blades and clippings under the blade up into its path to be cut. An inner fan creates a low pressure condition to draw the air from the outer fan inwards and then downwardly into the lawn.

The blade also draws air into the end of the blade as well as from beneath it. The novel blade design has the usual horizontal cutting edge but which is bent upwards at the tip to form a vertical cutting edge. As the mower is moved forward, the oncoming grass blades are drawn through an opening at the front of the mower into a nearly horizontally position by the action of the blade fan. The vertical cutting edge cuts the grass blades in small increments beginning at the tip of the grass blade and working down to the finish cut height. The cutting frequency is controlled by the engine speed and number of blades and is designed to produce small clipping of the desired length to best penetrate the lawn and not adhere to the inner walls of the mower. It is important to note that the production of small clippings occurs on the initial cut of the grass blade. Other configurations exist where the vertical blade cutting edge is tilted forward and achieves the desired tip-down cutting of the grass blades. However, the cut width is reduced by the amount of the overhang.

2. Cutting Chamber. The cutting chamber is a shroud-like enclosure surrounding the blade cutting area and open at the front to allow air to be drawn into the blade fan. The top surface of the chamber provides the mount for the mower powerplant. Clippings are cut along the blade cutting area proximate the front edge of the cutting chamber. The small clippings are then circulated around the blade cutting area in a horizontal manner where some are deposited in the cutting chamber and the majority enter the discharge chamber, from which the clippings are purged from the blade cutting area. As compared to the cut width of the mower, only half of the uncut grass is cut in the cutting chamber and all clippings are purged on each cycle. This positively limits the clipping density to an acceptable level to prevent clogging.

3. Discharge Chamber. The discharge chamber of the mower of this invention is an enclosure surrounding the remaining forward portion of the blade cutting area, and to the front edge of the discharge chamber, where the clippings are deposited near vertically into a prepared opening in the lawn at high velocity. The remaining half of the primary cut and the clippings from the cutting chamber are purged from the cutting cycle as they pass through the discharge chamber. A new cycle begins as the blade departs the discharge chamber and enters the cutting chamber. Any clippings not buried properly will be picked up in the discharge chamber and re-cut and re-deposited into the lawn while still in the discharge chamber. This process will repeat itself as many times as necessary to get the clippings properly buried.

4. Discharge Part. The discharge part in this invention creates a "part" in the lawn by directly opening the lawn "filter" to allow the clipping to be directly deposited onto the soil. The front edge of the discharge chamber bends the oncoming grass blades forward to create a "part" or open area immediately below the front edge. The clippings are blown downwardly into this open area and flow unrestricted onto the soil below. As the mower moves forward, the grass blades which are bent forward are released by the front edge of the mower and are then blown rearward by the air circulation in the discharge chamber. This causes the deposited clippings to be trapped in place next to the soil where they will decompose and nurture the lawn.

5. Plenum Chamber. The plenum chamber abuts the side of the discharge chamber and is directly ahead of the blade cutting area in the cutting chamber. The side adjoining the discharge chamber has an opening through which air pressure in the discharge chamber is allowed to pressurize the plenum chamber. This pressure then causes an enhanced flow of air into the blade cutting area of the cutting chamber.

Accordingly, the mulching lawn mower of this invention implements a design having these objectives:

A. To provide a mower blade that produces clippings on the initial cut that are small enough to be readily deposited beneath the grass filter onto the soil below. These small clipping resist adhering to the walls surrounding the air flow.

B. To generate a high velocity air flow in the cutting system to enable the clippings to better penetrate the lawn filter and not cling to the inner walls surrounding the air flow.

C. To provide a mower housing which is open along the front of the blade cutting area, allowing air and uncut grass blades to be drawn horizontally into the blade for proper cutting by the vertical cutting edge of the blade.

D. To provide a means to deposit as many as possible of the clipping onto the soil beneath the grass for better appearance and lawn health by directing the small clippings near-vertically through a prepared opening into the lawn at high velocity onto the exposed soil below.

E. To provide a means to re-cut and recycle in the discharge chamber any clipping not properly deposited the first time.

F. To prevent the cutting chamber from clogging and discharging unsightly deposits onto the finished lawn by reducing clipping density in the cutting chamber. This is accomplished specifically by limiting the intake of clippings to those produced by half the cut width of the mower and by purging the system at each blade revolution to prevent the continuous density build up that occurs in a closed cutting chamber design G. To beneficially use the potential energy built up by the high pressure air pocket created within the discharge air blast where it impacts the ground below the front of the discharge chamber. A significant portion of the pressure relieves itself by flowing rearward, complementing the air flow drawn by the blade fan into the blade cutting area in the discharge chamber. A similar level of air pressure is directed into the plenum chamber to similarly enhance the air flow being drawn into the blade cutting area of the cutting chamber. The residual pressure is regulated by the size of the opening below the bottom front edge of the discharge chamber. An amount of air is exhausted from this opening to equal an amount of new air drawn into the system by the low pressure condition that exists below the blade cutting area around the periphery of the cutting chamber. This inward flow of air is beneficial to prevent clippings from flowing out along this area and to build the air blast flow rate in the cutting chamber.

H. To provide a cut-off wall in the discharge chamber that purges the air flow and clippings on each revolution of the blade and generates a balanced forward air and clipping flow in the discharge chamber. This is achieved by having the inward angle of the blade fan direct air flow upward and then inwards along the cut off wall of the discharge chamber. This air flow towards the center of the discharge chamber provides a counter-effect to the air flowing in the direction of rotation of the blade.

I. To provide a circular shroud around the inner blade fan to cause a positive displacement of air by the fan creating a greater vacuum to positively attract air flow from the outer blade fan and to direct this flow into a likewise positive downward direction.

J. To provide a compactor foil below the rear of the blade to force the clippings from the inner fan into the lawn below the finish cut height of the lawn.

K. To provide a clean, smooth surface for minimum friction and no deposit build-up along the cutting chamber surfaces surrounding the blade fan and the adjoining inner fan shroud, a close tolerance (¼ inch, for example), conforming fit is preferably provided between the blade and housing surfaces. This close fit also creates a positive displacement of air along the path formed by the fan and housing shape.

L. To provide penetrator tabs that slice through the lawn below the finish cut height to cut and move downward any clippings in their path.

M. To provide a baffle in the discharge chamber to increase the flow rate of the discharge air to enhance penetration of clippings and to prevent clippings from adhering to the top of the front downward sloping wall of the discharge chamber.

N. To ensure that clippings do not escape out the side of the mower by providing keel structures that extend longitudinally into the lawn along the sides of the mower.

O. To ensure a final removal of any unsightly clipping that possibly remain along the rear semi-circle of the blade cutting area by using a lip around the arc that extends under the blade tip and causes a greater vacuum to be formed to pull these clipping into the blade path to be re-cut and re-deposited. This action taking place along the rear semi-circle does not reduce the cut width.

DESCRIPTION OF THE PREFERRED EMBODIMENT

Figure 1:
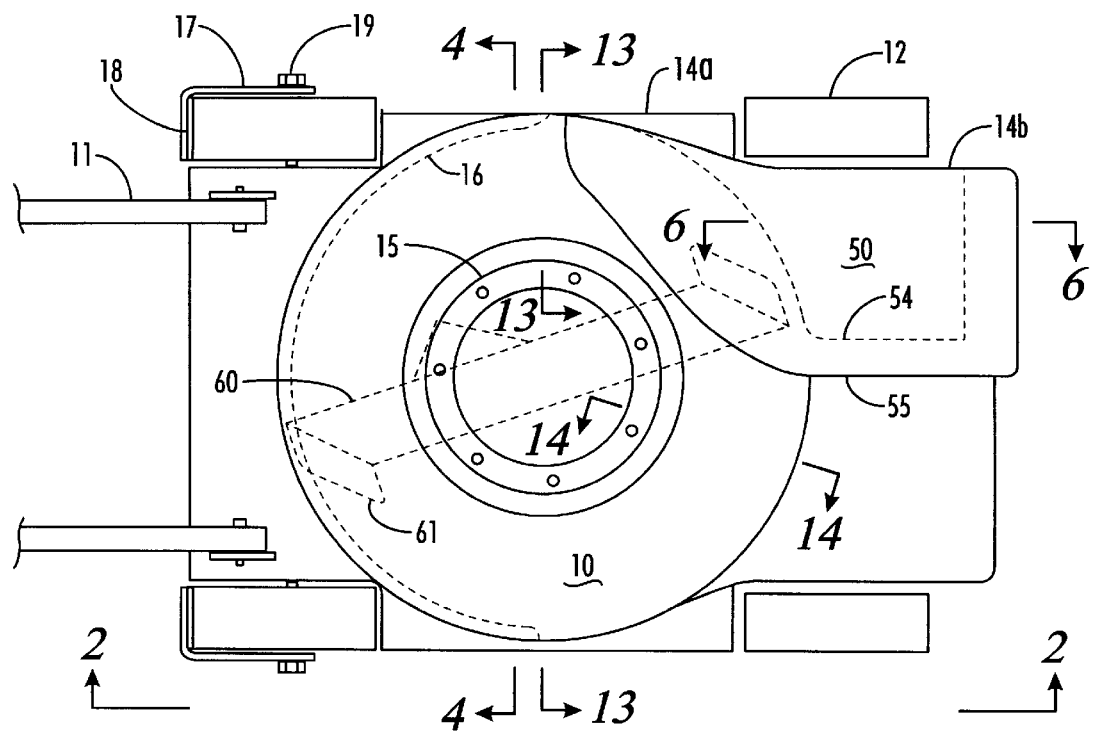
FIG. 1 is a top plan view of a rotary mower constructed in accordance with the present invention.
Figure 2:
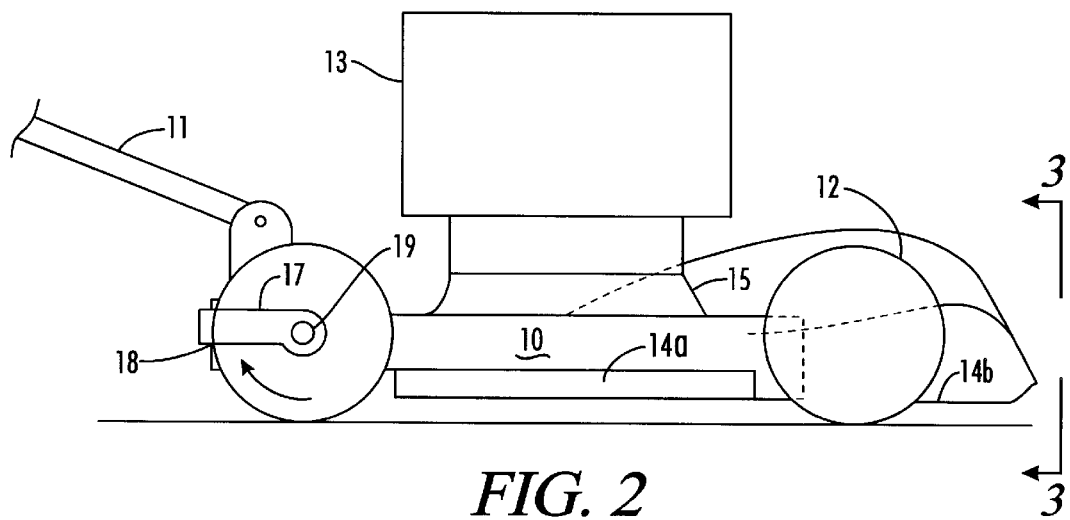
FIG. 2 is a side elevation view of the mower looking in the direction of arrows 2—2 in FIG. 1.

Referring initially to FIGS. 1 and 2 of the drawings, the rotary mulching mower of the invention is shown, having a main housing 10, operator control handle 11, four wheels 12, and a housing 10 with a circular engine mount flange 15 which supports a vertical crankshaft motor 13 (FIG. 2). The housing 10 includes a cutting chamber 1, a discharge chamber 2, and a plenum chamber 3. A cutting blade 60 is attached to the shaft of the motor 13 so that it can rotate inside the cutting chamber 1 and discharge chamber 2 of the housing 10.

Extending vertically downward from and attached to the lower portion of the right and left sides of the housing 10 are outer and inner keel members 14a and 14b, which function to restrict air flow and clipping discharge from the sides of the housing 10. The keel members 14a and 14b run longitudinally and extend approximately 1" below the plane of the blade cutting area, causing negligible drag to mower propulsion. The outer keel members 14a extend along a line between the front and rear wheels 12. The inner keel members 14b extend along a line from the front corner of the mower housing 10, inside the front wheels, and terminating at the rear of the front wheels 12 where the outer keels members 14a commence.

Figure 5A:
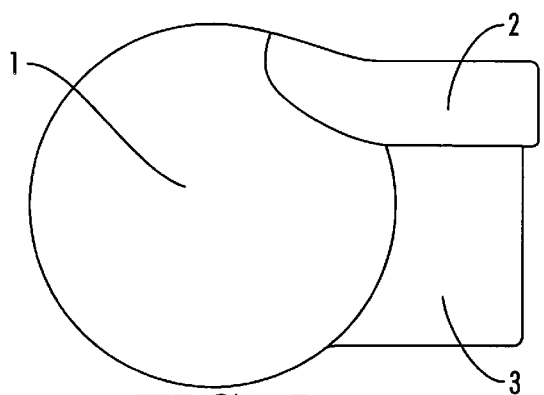
FIG. 5a is a top plan view of a first configuration for the cutting and discharge chamber portions of the mower.
Figure 5B:
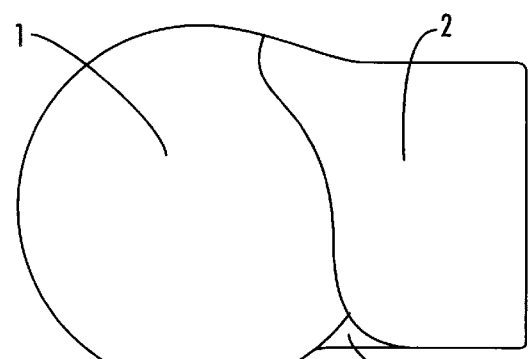
FIG. 5b is a top plan view of a second and preferred configuration for the cutting and discharge chamber portions of the mower, further showing an analysis of the flow patterns inside the cutting and discharge chambers.

To best understand the functioning of the various features of this invention, FIG. 5b shows an analysis of the air currents that exist in the cutting chamber 1. As discussed in more detail below, a fan action is generated by blade 60, resulting in an air blast 20. Air is first drawn into the fan beginning at point 21, and is horizontally accelerated around the blade cutting area to 22 where it enters the discharge chamber 2. Within the discharge chamber 2, the draft (FIG. 6) created along the blade cutting area at 23 rises at 24d to meet the air blast 20. This air flows forward along 24a the top of the discharge chamber 2 and then goes downward at 24b at the front of the discharge chamber 2, impacting with the soil 25 below the front edge 26 of the discharge chamber 2. This impact causes a high pressure zone 25 (FIGS. 5 and 6) to form immediately along and below the rear of the lower front edge 26. This high pressure zone diverts a portion of air flow in a rearward direction along 24c into the blade cutting area 23 where it is blown upward at 24d to complete the vertical flow cycle 24 defined by flow lines 24a, 24b, 24c, and 24d (FIG. 6) in the discharge chamber 2. This flow cycle spins continuously and centrifugally deposits the heavier grass clippings suspended in the air flow 24 as it passes the high pressure zone 25 where the clippings with their greater mass impact and adhere to the lawn. The air flow abruptly diverts upon hitting the lawn and proceeds in roughly equal amounts out the front at 29, rearward at 24c, and sidewards at opening 27 into the plenum chamber 3. The air flow at 27 pressurizes the plenum chamber 3 and enhances flow into the cutting chamber 1 at 28. The air flow at 28a is inward around the periphery of the cutting chamber 1 to balance the air exhausted from the housing at the front at 29 and 29a. The blade fan action also produces inner downward air flow 20a off the primary air blast 20.

Figure 9:
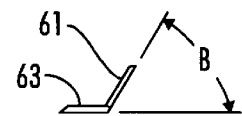
FIG. 9 is a sectional view of the blade looking along line 9—9 in FIG. 7.

Looking now at FIGS. 7–14, the novel design of the blade 60 is shown. Blade 60 includes a fan member 61 that blows air inward and upward. The plane of the fan member 61 intersects the horizontal plane of the blade 60 at a horizontal angle A of approximately 45° (FIG. 7) and the plane of the fan member 61 also intersects the horizontal plane of the blade 60 at a vertical angle B of approximately 60° (FIG. 9). The front cutting edge 62 of fan member 61 lies in a vertical plane passing through the extremity of the blade cutting area 23 and presents a swept back profile shown at 65 (FIG. 10) which gives a slicing action to its cut. The inward air flow across this vertical cutting surface 62 positions the grass blades to be cut from the tip down to the cut height into small clippings 45 (FIG. 6). To help create the inward air flow 28 and 24c there are inner downward deflecting fans 64 (FIGS. 7,8, and 10) built into each side of the blade 60. These fans 64 create a vacuum enhanced by shroud 72 (FIGS. 13 and 14) along their top side which, in conjunction with the air pressure created ahead of the fan member 61, move the air in an inward direction. A compactor foil 65 extends downward to approximately one half inch (½") below the finish cut height to positively bury the clippings below the finish cut surface 63. The downward angle of the compactor foil 65 also produces an additional low pressure along its top side to increase the inward and downward flow of air. This inward air flow is also enhanced by the inward air flow at 28 created into the cutting chamber 1 and the inward air flow 24b created in the discharge chamber 2 (FIG. 5). The inner fan 64 also functions to redirect the inward clipping flow from blade fan 61 into an accelerated vertical path giving greater penetration into the lawn by compactor foil 65.

The blade fan member 61 (FIG. 11) just prior to leaving the discharge chamber 2 is roughly parallel to the cut-off wall 66 of the discharge chamber 2. This causes a compression of air between the cut-off wall 66 and blade fan member 61 (FIG. 12) which causes an air flow 24d (FIGS. 11, 12) towards the center of the discharge chamber that counteracts and balances the flow produced by blade fan member 61 which is generally in the direction of blade travel. This produces a more uniform forward distribution of the air current 24a.

The cutting of the new grass blades is divided between the cutting chamber 1 and the discharge chamber 2 to reduce the clipping density in the cutting chamber 1. Accordingly, a clean cut and flow of clippings in the cutting chamber is propelled by the air blast created along 20 (FIG. 5) into discharge chamber 2 (FIG. 5) at 22 then circulates in the discharge chamber 2 as shown in FIG. 6. The air blast 20 forms the primary flow energizing the overall circulation. The vertical and generally circular flow pattern 24 is formed with flow forward at 24a, downwards at 24b, rearward at 24c, and upwards at 24d, and swirls continuously in conjunction with horizontal circulation 20.

The downward flow at 24b is at an angle of approximately 60° to the horizontal which with the rearward opening (53–26 in FIG. 6) pressure relief, causes the rearward air flow 24c, and resultant flow at 47 of the heavier clippings which impact the lawn in a near vertical manner. The front edge 26 of the discharge housing in combination with the forward air flow at 29 beneath it bends the oncoming grass 40 (FIG. 6) ahead of the front edge 26. This creates an opening or "part" at 41 between grass blades 40 and 42 so that the clippings can be deposited next to the soil at the base 25 of the grass blades As the mower moves forward, grass blade 40 is drawn into position 42 and this tends to seal the deposit of clippings at 25 in place. The rearward leaning grass blade 42 is directed towards the blade cutting area 23 by the air flow at 24c.

As the mower moves forward, the tip of this grass blade makes first contact with the vertical cutting edge 62 of blade 60. The upper portion of the grass blade at 43 is cut into successive small clippings 45 that are blown upwards at 24d, thereby completing the circular flow pattern 24. The grass blade at 43 is cut until reaching finish cut height 44 established by the height above the ground of the horizontal cutting edge 63 on blade 60.

If for whatever reason the clippings deposited at 25 are drawn up in the vacuum created behind the fan member 61 they will be re-cut and join the clippings 45 to be re-deposited. This is a continuous process and automatically assures that a proper clipping deposit is achieved.

Looking again at FIGS. 1 and 6, a baffle 50 extends inwardly from the side wall of the discharge chamber 2. The baffle 50 is curved as shown in FIG. 6 to form shape defined by sections 51, 52, and 53. This increases the flow rate in the vertical circular air flow 24 at the point across 36–52 where clippings are deflected downwards and most prone to adhere to the upper surface of the discharge chamber 2 along the surface at 36. The baffle 50 serves as a nozzle with its maximum velocity between points 36 and 52. The baffle 50 has an area of separation at 54–55 (FIG. 1) from the side of the discharge chamber 2 to prevent clippings from adhering in this area.

FIG. 6 also shows a rear profile of blade 60 as it exits the discharge chamber 2 (FIG. 11) while approaching the cut-off point 21. The discharge chamber cut-off wall 66 purges the clippings from the blade cutting area 23 and comes within close proximity of the blade fan member 61 (as shown in FIG. 6) along surface 30–31. Surfaces 31–32–33–34 (FIG. 6) define the plenum chamber 3 opening as it abuts the discharge chamber 2 and allows the air pressure pocket at the front of the discharge chamber 2 to flow into and pressurize the plenum chamber 3. The pressure in the plenum chamber 3 (FIG. 5b) then relieves itself as flow 28 through the opening into the cutting chamber 1. This opening forward of blade 60 is shown in FIG. 6 and vertically extends from point 32 to the ground. The upper approximately one-third of the vertical cutting edge 62 of blade 60 is enclosed by surfaces 31–32 to increase draft 28 below surface 32. This surface 31–32 continues around the front periphery of the cutting chamber 1 where it joins the plenum chamber 3.

Figure 8:
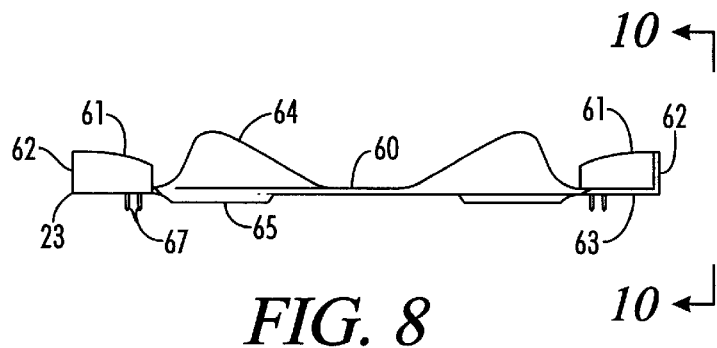
FIG. 8 is a side elevation view of the blade looking in the direction of arrows 8—8 in FIG. 7.
Figure 10:
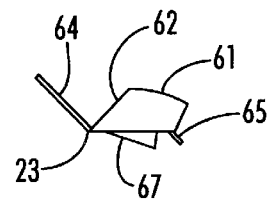
FIG. 10 is a side elevation view of the blade looking in the direction of arrows 10—10 in FIG. 8.
Figure 11:
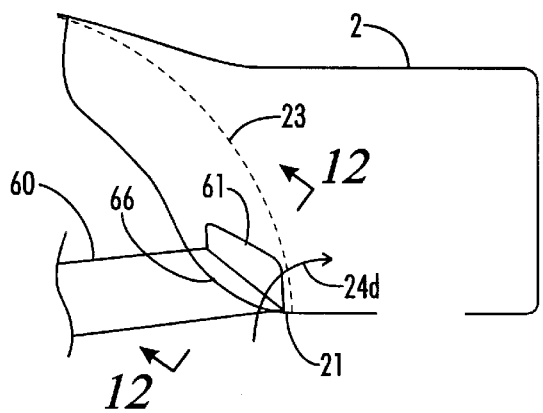
FIG. 11 is a segmented plan view of the discharge chamber of the mower in accordance with the invention.
Figure 12:
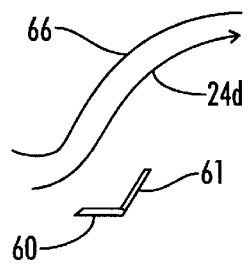
FIG. 12 is a sectional view along line 12—12 in FIG. 11, showing the blade and cut-off wall of the surrounding housing.

Another novel feature of the invention is penetration tabs 67, best seen in FIGS. 8 and 10, which extend approximately three-fourths inch (¾") below the blade cut height 63 and slice through the lawn with little resistance. The forward sharpened edges of tabs 67 cut and push down any suspended clippings that come in their path. Two tabs, each one-half inch (½") apart, extend vertically downward in pairs from each end of the blade. When the engine is at recommended operating speed, the tabs cause circular furrows to be made less than one-fourth inch (¼") apart across the width of their diameter to further remove any unsightly clipping from the finish cut surface.

Figure 3:
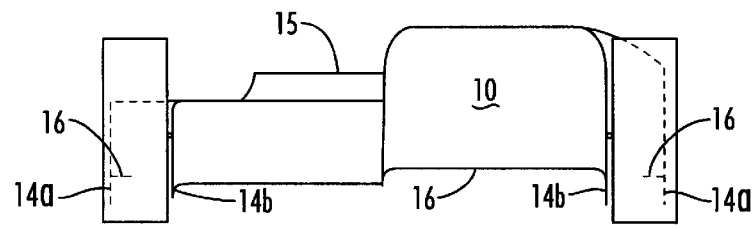
FIG. 3 is a front elevation view of the mower without the engine, looking in the direction of arrows 3—3 in FIG. 2.
Figure 4:
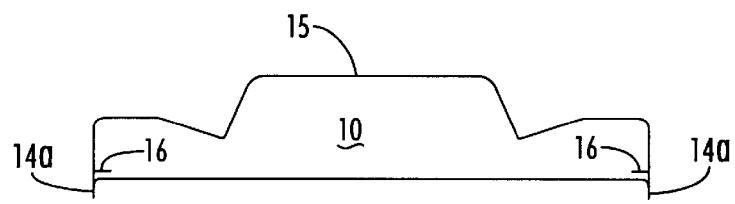
FIG. 4 is a transverse sectional view of the mower housing along line 4—4 in FIG. 1.

Another feature of the invention is an approximate one-half inch (½") lip 16 (FIGS. 1, 3, 4) that is turned under around the rear semi-circle of the cutting chamber 1. The lip 16 (FIG. 1) extends approximately one-fourth inch (¼") below the blade cutting area 23. Its function is to increase the vacuum created by the action of blade fan member 61 along this area without decreasing the cut width. This provides a final defense against the deposit of unsightly grass clippings before the mower leaves the area in which it is operating.

A further improvement is a rear wheel scraper 17 (FIGS. 1 and 2) which removes sticky grass clippings that are pressed onto the rear wheels when the mower is operating under adverse conditions. Scraper 7 is a spring steel "L" shaped accessory which is held in place at the end of the wheel axle by the wheel retaining bolt 19. The rear scraper edge 18 rubs on the wheel surface and scrapes off any material clinging to the wheel.

Thus, although there have been described particular embodiments of the present invention of a Mulching Lawn Mower with Vertical Cutting and Improved Discharge Action and Clipping Deposit it is not intended that such references or dimensional information be construed as limitations upon the scope of this invention except as set forth in the following claims.

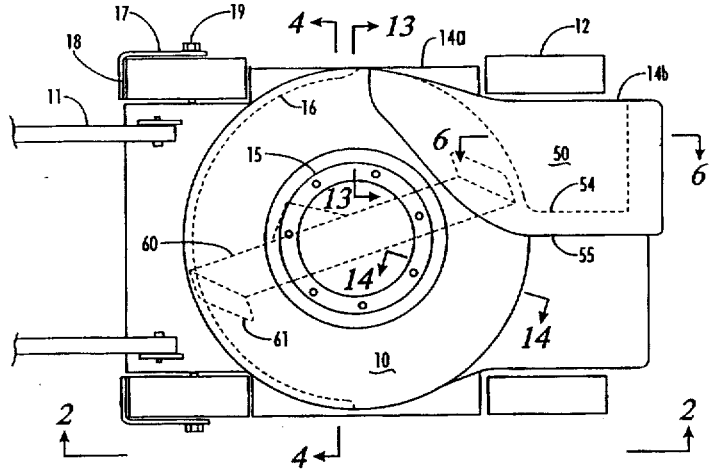

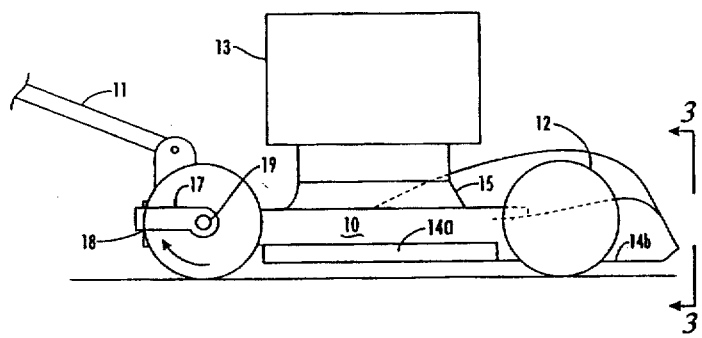

What I claim is:

1. A recycling mower for cutting blades of grass in a lawn comprising:

a. a motor mounted on a top surface of a mower housing, a handle attached to a rear portion of the housing, and front and rear wheels attached to side portions of the housing;

b. the housing including an interior cutting chamber and a discharge chamber which is separate from the cutting chamber;

c. a blade attached to a rotating shaft on the motor and mounted inside the housing in a position whereby the motor rotates the blade in a horizontal plane within the cutting chamber and partially within the discharge chamber to define a blade cutting area where the blades of grass are cut by the blade;

d. the discharge chamber aligned directly ahead of the blade cutting area in the cutting chamber;

e. an opening between the cutting chamber and the discharge chamber proximate a section of an outer margin of the blade cutting area; and f. air flow control means to direct air flow within the housing, to confine clippings cut from the blades of grass within the housing, and to suspend a portion of the clippings within the air flow until the clippings are moved into the discharge chamber by the air flow and deposited into the lawn downwardly from the discharge chamber.

2. The mower of claim 1, the air flow control means comprising a plenum chamber integral to the housing and positioned adjacent to the discharge chamber, the housing having horizontal air flow openings between the discharge chamber and the plenum chamber and between the cutting chamber and the plenum chamber whereby clippings can move from the discharge chamber into the plenum chamber and back into the cutting chamber.

3. The mower of claim 2, the air flow control means further comprising left and right keel members attached to and extending along and below the sides of the housing.

4. The mower of claim 3, the air flow control means further comprising a lip which is attached to and extends inwardly from a rear semi-circular portion of the cutting chamber and below a portion of the blade cutting area.

5. The mower of claim 4, the air flow control means further comprising a baffle which is attached to and extends inwardly from a side wall of the discharge chamber, the baffle including horizontal and curved sections.

6. The mower of claim 1, the cutting blade comprising fan means to draw air into the housing and blade cutting area to initiate the air flow, the cutting blade further comprising vertical cutting surfaces, whereby as the mower is moved forward, blades of grass in the lawn proximate a front open edge of the housing are bent horizontally by the air flow and are cut one or more times by the vertical cutting surfaces of the blade.

7. The mower of claim 6, the air flow control means comprising a curved top edge of the discharge chamber whereby the air flow is directed horizontally through the discharge chamber and then vertically downward into the lawn proximate the front edge of the discharge chamber.

8. The mower of claim 1, the air flow control means comprising a curved side wall located to deflect all of the air flow and suspended clippings from the blade cutting area and to divide cutting of oncoming blades of grass between the cutting chamber and the discharge chamber.

9. An improved mulching mower for cutting blades of grass, the mower having a housing including a front edge, a motor mounted to the housing, a cutting area within the housing, and a cutting blade attached to the motor, the improvement comprising:

grass bending means to bend blades of grass from a substantially vertical position toward the cutting area;

vertical cutting means attached to the cutting blade for successively cutting blades of grass bent toward the cutting area into shorter blades of grass as the cutting area advances towards the bent blades of grass, thus creating a plurality of grass clippings;

a cutting chamber within the housing; and a discharge chamber within the housing and separate from and adjacent to the cutting chamber, the discharge chamber being open downward towards the blades of grass, and including an opening between the cutting chamber and the discharge chamber; wherein the cutting blade is rotatably mounted within the cutting chamber to sweep out the cutting area, and wherein the cutting blade includes fan means for creating an airflow for propelling clippings from the cutting chamber into the discharge chamber; and wherein the cutting area includes a portion intersecting the opening between the cutting chamber and the discharge chamber such that grass cutting occurs in both the cutting chamber and the discharge chamber.

10. The mower of claim 9, wherein the discharge chamber comprises a cut-off wall; and the cutting blade fan means includes a fan member roughly parallel to the cut-off wall just prior to leaving the discharge chamber.

11. The mower of claim 9, wherein the cutting chamber comprises a rear semi-circular section including a lip below the cutting area and extending horizontally into the cutting chamber.

12. The mower of claim 9, the improvement further comprising a plenum chamber in the housing and in fluid communication with the discharge chamber and the cutting chamber such that a portion of the airflow exiting the discharge chamber is directed into the cutting chamber.

13. The mower of claim 9, the improvement further comprising:

grass parting means for creating a part in the blades of grass proximate the housing front edge such that grass ahead of the front edge of the housing is bent away from the front edge in a forward direction and grass behind the front edge is bent away from the front edge in a rearward direction; and means to direct a portion of the air flow vertically downward toward the part in the blades of grass, whereby a majority of the clippings are forced into the part in the blades of grass.

14. The mower of claim 9, the improvement further comprising:

an upper surface in the discharge chamber; and baffle means internal to the discharge chamber for increasing movement of air away from the discharge chamber upper surface, whereby adherence of clippings to the discharge chamber is reduced.

15. A mower for cutting blades of grass in a lawn into small clippings suitable for discharging back into the lawn comprising:

a. a housing having a cutting chamber, a discharge chamber, and a plenum chamber;

b. a motor mounted above the housing and having a shaft extending into cutting chamber from above the housing;

c. a cutting blade attached to the motor shaft such that rotation of the shaft will rotate the cutting blade in a horizontal plane within the housing;

d. a handle and front and rear wheels attached to the housing whereby a user of the mower can push it forward through the lawn;

e. the cutting blade having a fan member for producing a horizontal and vertical air flow within the housing, and vertical cutting surfaces, the rotating cutting surfaces defining a blade cutting area;

f. a first opening between the cutting chamber and the discharge chamber to allow for horizontal movement of the air flow between the cutting and discharge chambers proximate the blade cutting area;

g. a second opening between the discharge chamber and the plenum chamber to allow for horizontal movement of a portion of the air flow from the discharge chamber to the plenum chamber;

h. a third opening between the plenum chamber and the cutting chamber to allow for horizontal movement of a portion of the air flow from the plenum chamber back into the cutting chamber;

i. a baffle attached to and extending substantially horizontally inward from a side wall of the discharge chamber, the baffle having a horizontal section positioned above the horizontal plane of the cutting blade and curved sections positioned in part below the horizontal plane of the blade;

j. inner and outer keel members mounted to each side wall of the housing between the front and rear wheels and extending vertically below the horizontal plane of the cutting blade;

k. a horizontal lip extending inwardly into the cutting chamber from a semicircular section of an outer rear margin of the cutting chamber, the lip positioned below the horizontal plane of the cutting blade; and l. the discharge chamber having a front edge which curves downwardly toward the lawn whereby a portion of the air flow which enters the discharge chamber is directed vertically down into the lawn ahead of the blade cutting area.

16. A recycling mower for cutting blades of grass in a lawn comprising:

a. a motor mounted on a top surface of a mower housing, and front and rear wheels attached to side portions of the housing;

b. the housing including an interior cutting chamber, a discharge chamber separate from the cutting chamber, and a front;

c. a blade attached to a rotating shaft on the motor and mounted inside the housing in a position whereby the motor rotates the blade in a horizontal plane within the cutting chamber and partially within the discharge chamber to define a blade cutting area where the blades of grass are cut by the blade;

d. the discharge chamber aligned directly ahead of the blade cutting area in the cutting chamber;

e. an opening between the cutting chamber and the discharge chamber proximate a section of an outer margin of the blade cutting area; and f. air flow control means to direct air flow within the housing, to confine clippings cut from the blades of grass within the housing, and to suspend a portion of the clippings within the air flow until the clippings are moved into the discharge chamber by the air flow and deposited into the lawn downwardly from the discharge chamber.

17. The mower of claim 16, wherein the air flow control means comprises a plenum chamber in fluid communication with the cutting chamber and the discharge chamber, and
wherein the housing includes a first air flow opening between the discharge chamber and the plenum chamber, and a second air flow opening between the cutting chamber and the plenum chamber, the first and second air flow openings operably positioned such that clippings move from the discharge chamber into the plenum chamber then into the cutting chamber, whereby the clippings may be recut.

18. The mower of claim 17, wherein the blade comprises:
fan means for drawing air into the housing and blade cutting area to propagate the air flow, and for bending blades of grass in the lawn proximate the housing front horizontally toward the cutting area; and vertical cutting surfaces position such that as the mower is advanced, blades of grass horizontally bent toward the cutting area are cut at least one time by the vertical cutting surface.

\* \* \* \* \*

UNITED STATES PATENT AND TRADEMARK OFFICE
CERTIFICATE OF CORRECTION

PATENT NO. : 5,921,072
DATED : July 13, 1999
INVENTOR(S) : W. Allen Cargile

Figure 13:
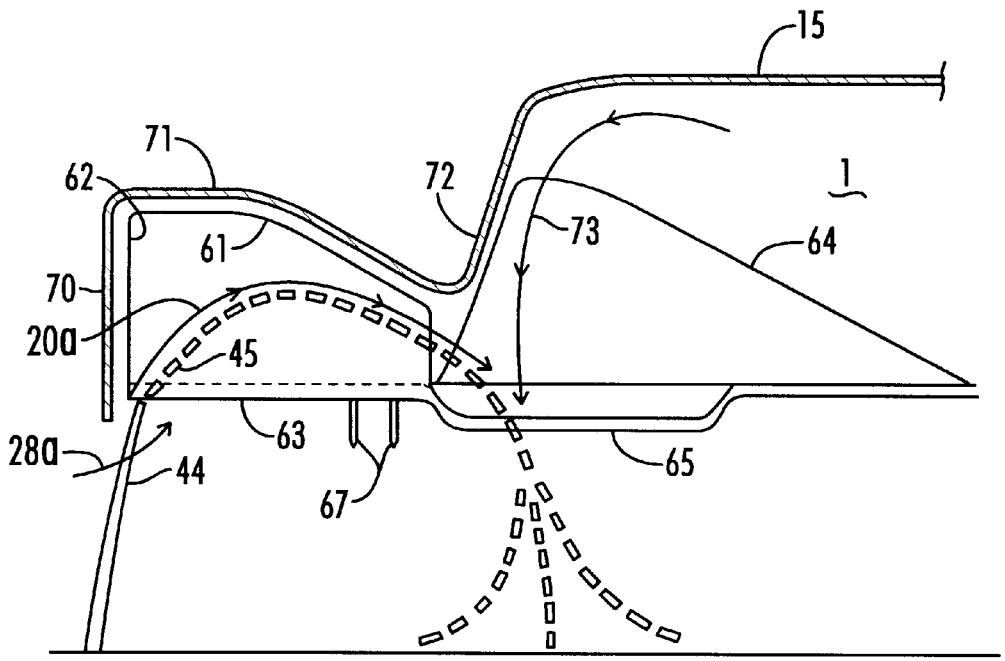
FIG. 13 is a sectional view along line 13—13 in FIG. 1 showing the blade and surrounding housing
Figure 14:
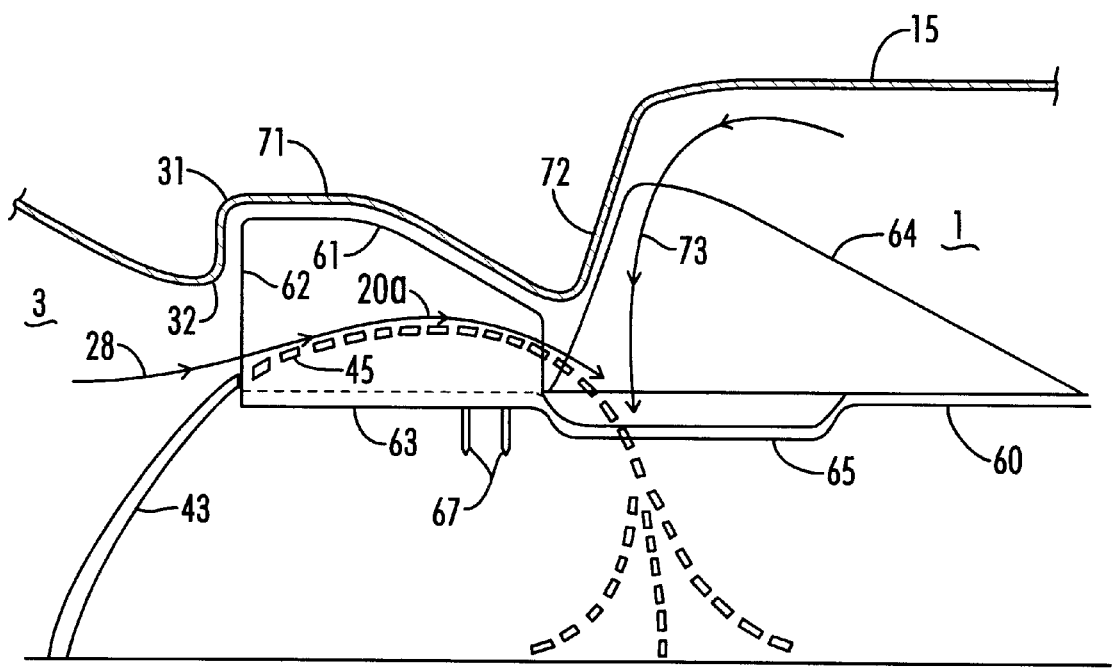
FIG. 14 is a sectional view along line 14—14 in FIG. 1 showing the blade and surrounding housing.
Figure 1:
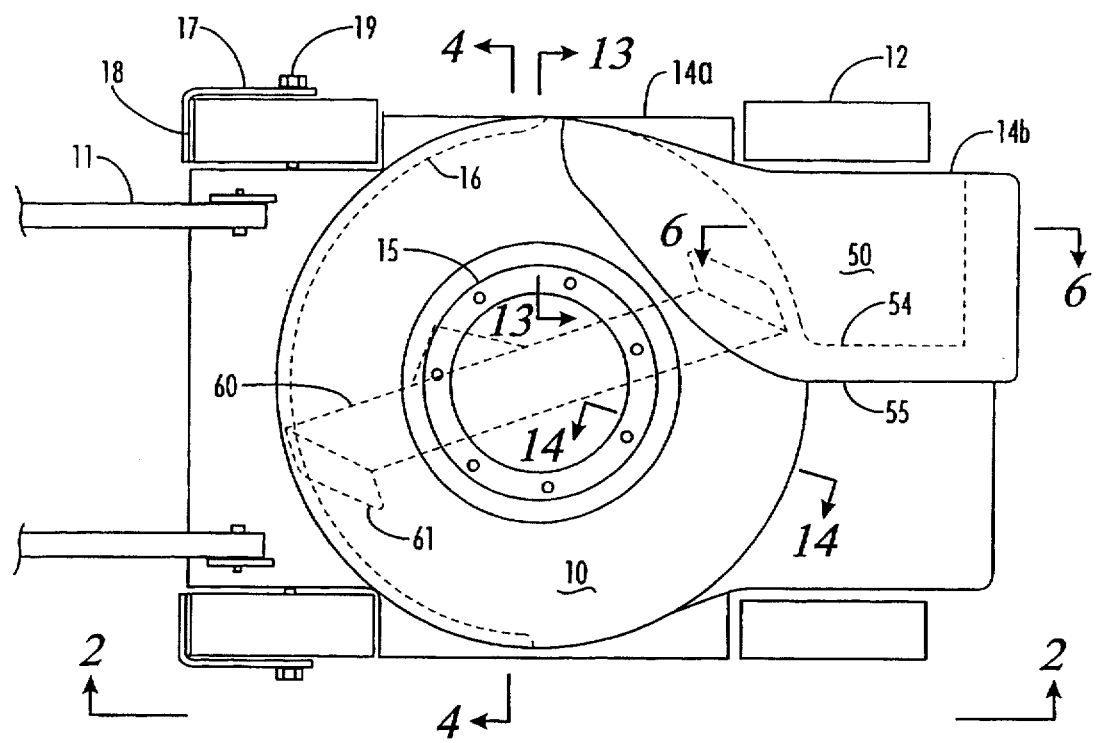
Figure 2:
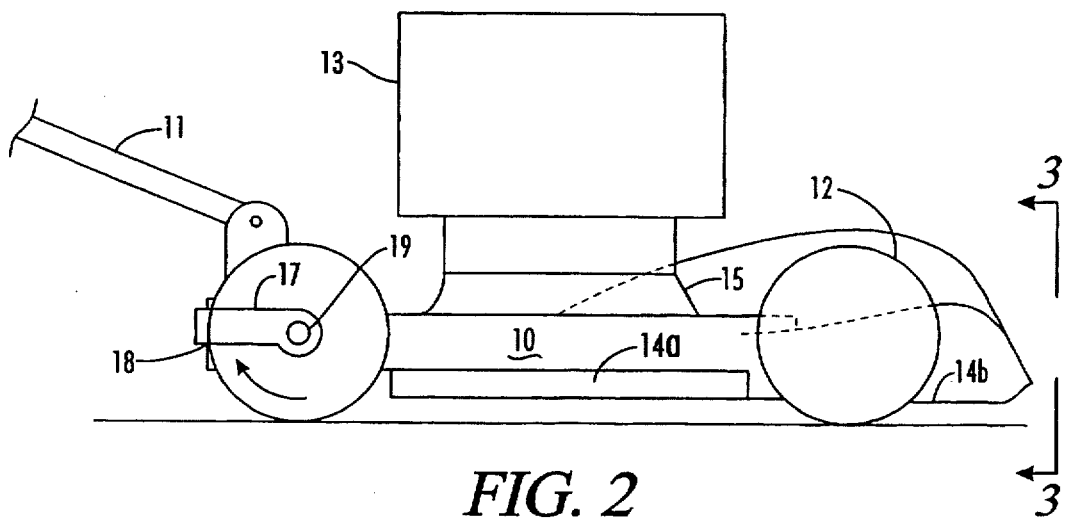
Figure 3:
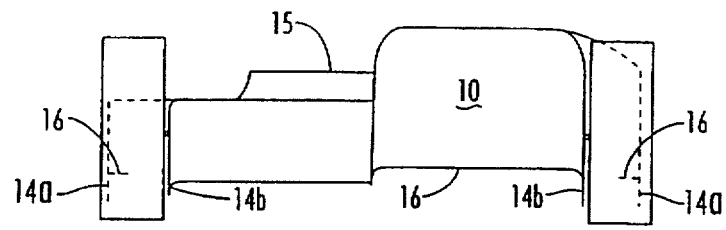
Figure 4:
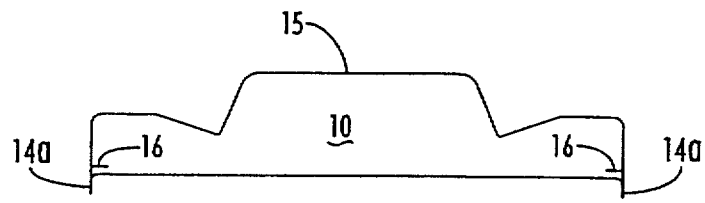
Figures 5A, 5C:
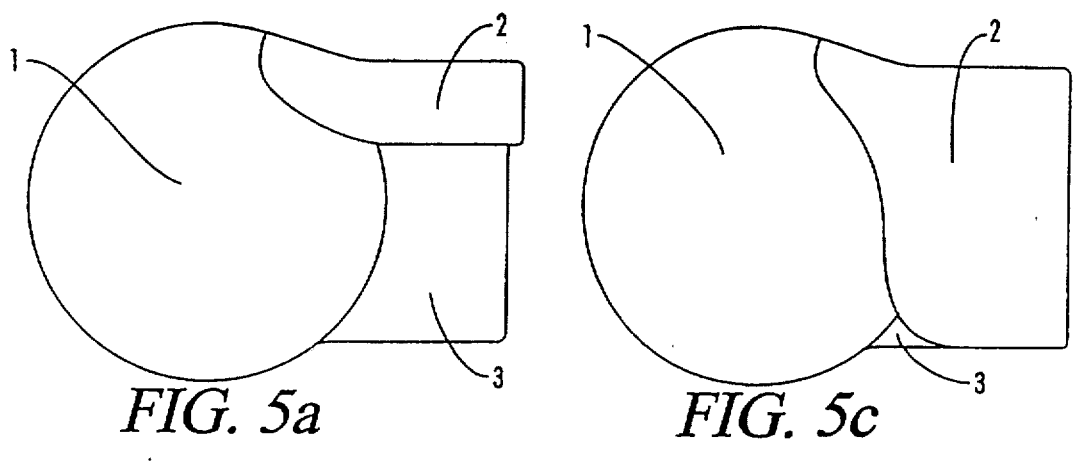
Figure 5B:
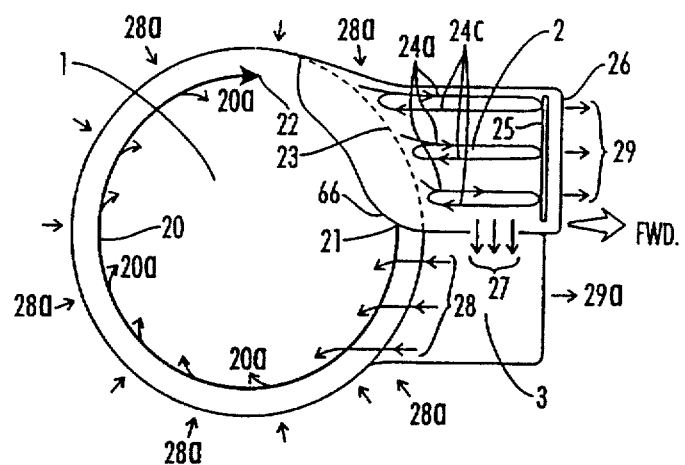
Figure 6:
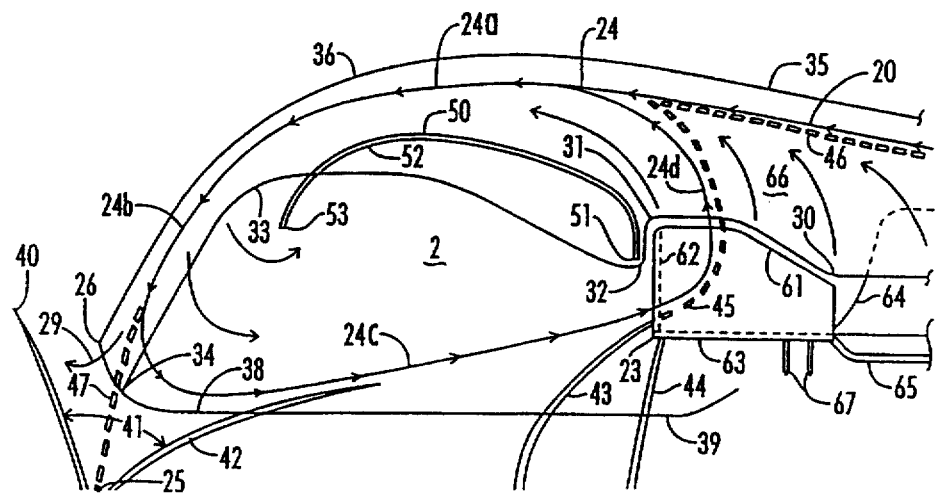

It is certified that error appears in the above-identified patent and that said Letters Patent is hereby corrected as shown below:

*In the Drawings,* as shown on the attached pages:

On Sheet 1 of 5, in Fig. 1, the reference to the sectional view shown in Fig. 13 which is directly above the title "Fig. 1" is a duplicate and should be deleted.

On Sheet 1 of 5, in Fig. 2, the section of the broken line below the horizontal broken line shown in the wheel designated 12 should be deleted.

Figure 5C:
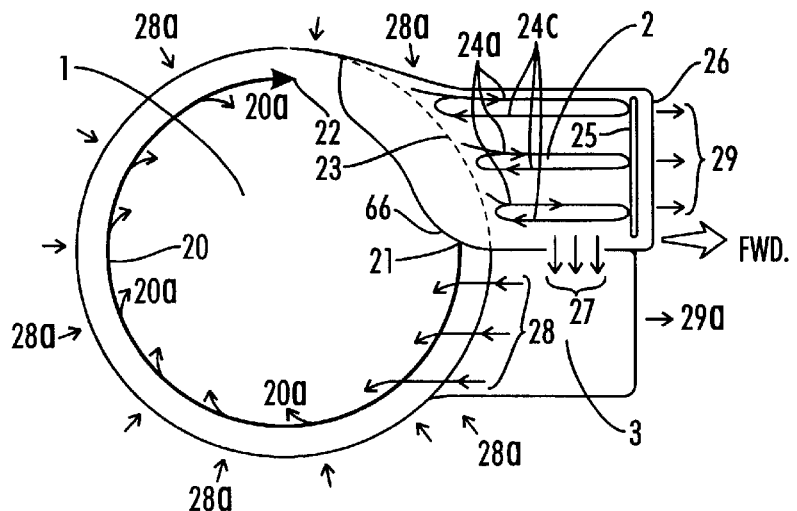
FIG. 5c is a top plan view of a third configuration for the cutting and discharge chamber portions of the mower
Figure 6:
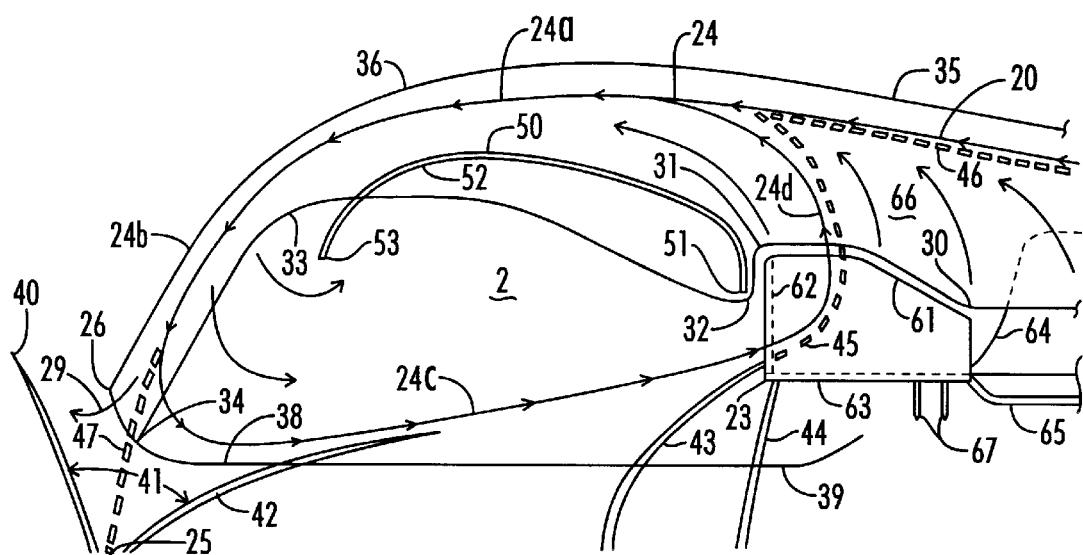
FIG. 6 is an enlarged transverse sectional view along line 6—6 in FIG. 1, showing the blade aligned in a fore and aft position and further illustrating air flow inside the mower housing in accordance with FIG. 5b.
Figure 7:
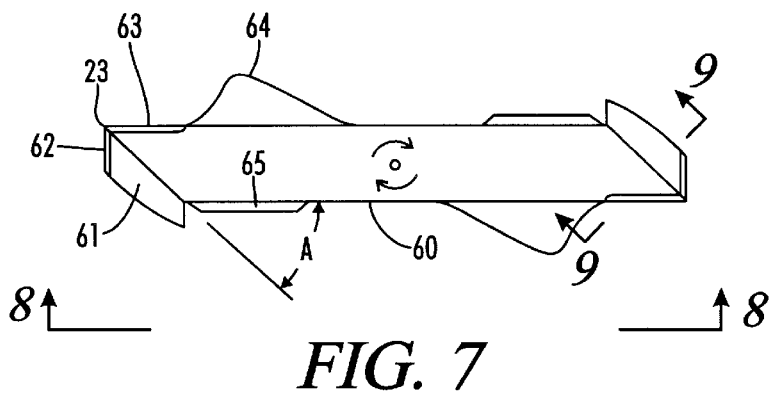
FIG. 7 is a top plan view of the blade for the mower in accordance with this invention.

On Sheet 2 of 5, in Fig. 5b, delete "Fig. 5b" and insert –Fig. 5c--.

On Sheet 3 of 5, in Fig. 5c, delete "Fig. 5c" and insert –Fig. 5b--.

UNITED STATES PATENT AND TRADEMARK OFFICE
CERTIFICATE OF CORRECTION

PATENT NO. : 5,921,072
DATED : July 13, 1999
INVENTOR(S) : W. Allen Cargile

It is certified that error appears in the above-identified patent and that said Letters Patent is hereby corrected as shown below:

On Sheet 3 of 5, in Fig. 6, reference numeral 24b should refer to the line with directional arrows.

Signed and Sealed this

First Day of February, 2000

Attest:

Q. TODD DICKINSON

*Attesting Officer*   *Acting Commissioner of Patents and Trademarks*

United States Patent
Cargile

[11] Patent Number: 5,921,072
[45] Date of Patent: Jul. 13, 1999

[54] MULCHING LAWN MOWER WITH VERTICAL CUTTING AND IMPROVED DISCHARGE ACTION AND CLIPPING DEPOSIT

[76] Inventor: W. Allen Cargile, 5796 Peach Hollow Rd., Franklin, Tenn. 37064

[21] Appl. No.: 08/671,365

[22] Filed: Jun. 27, 1996

[51] Int. Cl.$^6$ .................................................. A01D 34/60
[52] U.S. Cl. ................................... 56/17.5; 56/320.2
[58] Field of Search ............................ 56/16.7, 17.3, 56/17.5, 175, 320.1, 320.2, 255, 295

[56] References Cited

U.S. PATENT DOCUMENTS

| | | | |
|---|---|---|---|
| 2,942,400 | 6/1960 | Sylvester | 56/255 |
| 2,957,295 | 10/1960 | Brown | 56/295 |
| 3,413,783 | 12/1968 | Gordon | 56/320.2 |
| 5,117,616 | 6/1992 | McLane | 56/17.5 |
| 5,209,050 | 5/1993 | Carrigan | 56/320.1 X |
| 5,291,725 | 3/1994 | Meinerding | 56/295 |

Primary Examiner—Thomas B. Will
Assistant Examiner—Robert Pezzuto
Attorney, Agent, or Firm—Waddey & Patterson; Edward D. Lanquist, Jr.

[57] ABSTRACT

An improved mulching lawn mower has separate cutting and discharge chambers integral to the mower housing. An air flow initiated by cutting blade fan action positions uncut blades of grass ahead of the blade into a horizontal position where vertical cutting surfaces on the blade successively cut the blade into small clippings. The mower's air flow is directed vertically downward into the lawn at a front edge of the discharge chamber through a prepared opening, depositing the clippings into the lawn near the soil. Only one-half of the cut width of grass is cut in the cutting chamber and any suspended clippings from the cutting chamber are purged on each cycle. These measures limit the clipping density in the cutting chamber to an acceptable level.

18 Claims, 5 Drawing Sheets